(12) United States Patent
Kovach (10) Patent No.: US 11,076,522 B2
(45) Date of Patent: Aug. 3, 2021

(54) STRIP-TILL KNIFE WITH WINGS

(71) Applicant: CNH Industrial America LLC, New Holland, PA (US)

(72) Inventor: Michael G. Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 177 days.

(21) Appl. No.: 16/183,033

(22) Filed: Nov. 7, 2018

(65) Prior Publication Data

US 2020/0137940 A1    May 7, 2020

(51) Int. Cl.
*A01B 13/02*    (2006.01)
*A01C 5/06*    (2006.01)
*A01B 15/06*    (2006.01)

(52) U.S. Cl.
CPC .............. *A01B 13/02* (2013.01); *A01B 15/06* (2013.01); *A01C 5/062* (2013.01)

(58) Field of Classification Search
CPC ......... A01B 13/02; A01B 13/00; A01B 15/06; A01B 15/04; A01B 15/00; A01C 5/062; A01C 5/06; A01C 5/00
See application file for complete search history.

(56) References Cited

U.S. PATENT DOCUMENTS

| | | |
|---|---|---|
| 3,605,657 A | 9/1971 | Brannan |
| 4,141,301 A | 2/1979 | Coldren |
| 4,565,141 A | 1/1986 | Kopecky |
| 4,592,294 A | 6/1986 | Dietrich |
| 4,683,826 A | 8/1987 | Solie et al. |
| 4,770,112 A | 9/1988 | Neumeyer |
| 4,773,340 A | 9/1988 | Williams et al. |

(Continued)

FOREIGN PATENT DOCUMENTS

| | | |
|---|---|---|
| GB | 1493116 | 11/1977 |
| GB | 1603106 | 11/1981 |
| WO | 2017027907 | 2/2017 |

OTHER PUBLICATIONS

Tillage Product Support, catalog, 37 pages, 2016, CNH Industrial America LLC; available as Vetter Equipment Catalog at: available at: https://www.vetterequip.com/siteart/parts/tillage-catalog.pdf.

(Continued)

*Primary Examiner* — Christopher J. Novosad
(74) *Attorney, Agent, or Firm* — Rebecca L. Henkel; Rickard K. DeMille (57) ABSTRACT

A knife for creating berms in agricultural fields for strip-till farming includes wings on opposing sides of the knife edge that are configured to fracture and raise soil in a wider path for building a berm behind the knife. The wings can be swept back, angled downward from front to back, and angled downward from inside to outside, for better loosening compacted soil below the surface and creating improved berms rearward of the knife. The knife edge can be replaceable by removal of a single pin. If a difficult object is encountered, such as large rocks or tree roots, the knife can swing reward with respect to a supporting shank to minimize damage to the knife. Upon swinging reward, an agricultural product delivery tube rearward of the knife for depositing agricultural product into the berm can swing forward to minimize crimping of the delivery tube.

20 Claims, 8 Drawing Sheets

(56) References Cited

U.S. PATENT DOCUMENTS

| | | | |
|---|---|---|---|
| 4,895,211 A * | 1/1990 | Harris | A01B 13/00 |
| | | | 172/271 |
| 5,415,236 A | 5/1995 | Williams | |
| 5,865,131 A | 2/1999 | Dietrich, Sr. et al. | |
| 6,178,900 B1 | 1/2001 | Dietrich, Sr. | |
| 6,302,040 B2 | 10/2001 | Lempriere | |
| 6,397,767 B1 | 6/2002 | Dietrich, Sr. | |
| 6,443,237 B1 | 9/2002 | Myers et al. | |
| 6,860,336 B2 | 3/2005 | Robillard | |
| 6,966,270 B2 | 11/2005 | Rowlett et al. | |
| 6,973,884 B2 | 12/2005 | Dietrich | |
| 8,544,395 B2 | 10/2013 | Dietrich | |
| 8,833,483 B2 | 9/2014 | Knobloch et al. | |
| 9,066,462 B2 | 6/2015 | Arksey et al. | |
| 9,226,437 B2 | 1/2016 | Dietrich | |

OTHER PUBLICATIONS

Nichols Tillage Tools Winged Knives, website, Jun. 13, 2018, 2 pages, Nichols Tillage Tools; available at: https://www.nicholstillagetools.com/ECommerce/category/fertilizer-knives/winged-knives.

* cited by examiner

STRIP-TILL KNIFE WITH WINGS

FIELD OF THE INVENTION

The present invention relates generally to a knife for tilling agricultural fields, and more particularly, to a strip-till knife having a body configured to connect to a shank, a knife edge extending from a front portion of the body in a direction of travel for creating a berm aft of the body, wings extending from side portions of the body for fracturing and lifting soil laterally with respect to the body, and an agricultural product delivery tube for depositing an agricultural product into the berm.

BACKGROUND OF THE INVENTION

Fertilizer knives are agricultural tools typically found as points on implements used to cut slots into soil. When the slots are cut, various types of fertilizers, whether dry, liquid or gas, can be placed into the slots for absorption by plant roots. Fertilizer knives are typically narrow in width for cutting about 5-6" deep into the ground.

Strip-till is a farming practice in which a berm of loose soil is created so that plant seed and/or fertilizers can be placed on the berm. Knives can be used to create berms in strip-till farming, including as described in U.S. Pat. No. 8,833,483, entitled "Sealing Disc Having Soil Build-Up Reducing Feature," assigned to CNH Industrial America, the contents of which is incorporated herein by reference. In strip-till, by having a loose and raised berm, the raised soil can have less plant residue than between the berms. This can warm the soil quickly to cause seeds to germinate with greater success. It is desirable to improve strip-till systems to further increase the effectiveness of strip-till farming.

SUMMARY OF THE INVENTION

A knife for creating berms in agricultural fields for strip-till farming is improved by adding wings on opposing sides of the knife edge that are configured to fracture and raise soil in a wider path for building a berm behind the knife. The wings can be swept back, angled downward from front to back, and angled downward from inside to outside, for better loosening compacted soil below the surface and creating improved berms rearward of the knife. The knife edge can be replaceable by removal of a single pin. If a difficult object is encountered, such as large rocks or tree roots, the knife can swing reward with respect to a supporting shank to minimize damage to the knife. Upon swinging reward, an agricultural product delivery tube rearward of the knife for depositing agricultural product into the berm can swing forward to minimize crimping of the delivery tube.

In one aspect, by virtue of the aforementioned wings, soil can be fractured and loosened in a wider strip. This, in turn, can cause fertilizer to penetrate and mix with the soil. This can create more loose soil for an improved berm and root growth. This can also remove more soil compaction. In other words, the wings can create a wider swath of loose soil than conventional knives. A wing angle can be such that it does not create a smear layer below the wings. The wing angle can lift twist and roll the soil. The wings can bring additional loose soil to the surface to aid in creating an improved berm behind the tillage pass. A replaceable shin and nose (which can be held on by one pin) can be replaced when the leading edge wears. When an obstruction is encountered, a bolt can shear, and a fertilizer tube can pivot so as to not bind or crimp a delivery hose. Fertilizer delivery tube(s) can be adjustable up and down to control the depth of fertilizer independent of the depth of tillage. The wings can create additional loose soil and break up compaction.

Specifically then, one aspect of the present invention can provide a strip-till knife, including: a body configured to connect to a shank; a knife edge extending from a front portion of the body in a direction of travel, the knife edge being configured to engage soil along the direction of travel to create a berm aft of the body, the knife edge having a nose extending from a lower most portion; first and second wings extending from first and second side portions of the body, respectively, the first and second wings being configured to lift soil laterally with respect to the body; and an agricultural product delivery tube extending from a rear portion of the body, the agricultural product delivery tube being configured to deposit an agricultural product into the berm.

Another aspect of the present invention can provide a method for providing a strip-till knife, including: providing a body for connecting to a shank; providing a knife edge extending from a front portion of the body in a direction of travel, the knife edge for engaging soil along the direction of travel to create a berm aft of the body, the knife edge having a nose extending from a lower most portion; providing first and second wings extending from first and second side portions of the body, respectively, the first and second wings for lifting soil laterally with respect to the body; and providing an agricultural product delivery tube extending from a rear portion of the body, the agricultural product delivery tube for depositing an agricultural product into the berm.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION OF THE PREFERRED EMBODIMENTS

Figure 1:
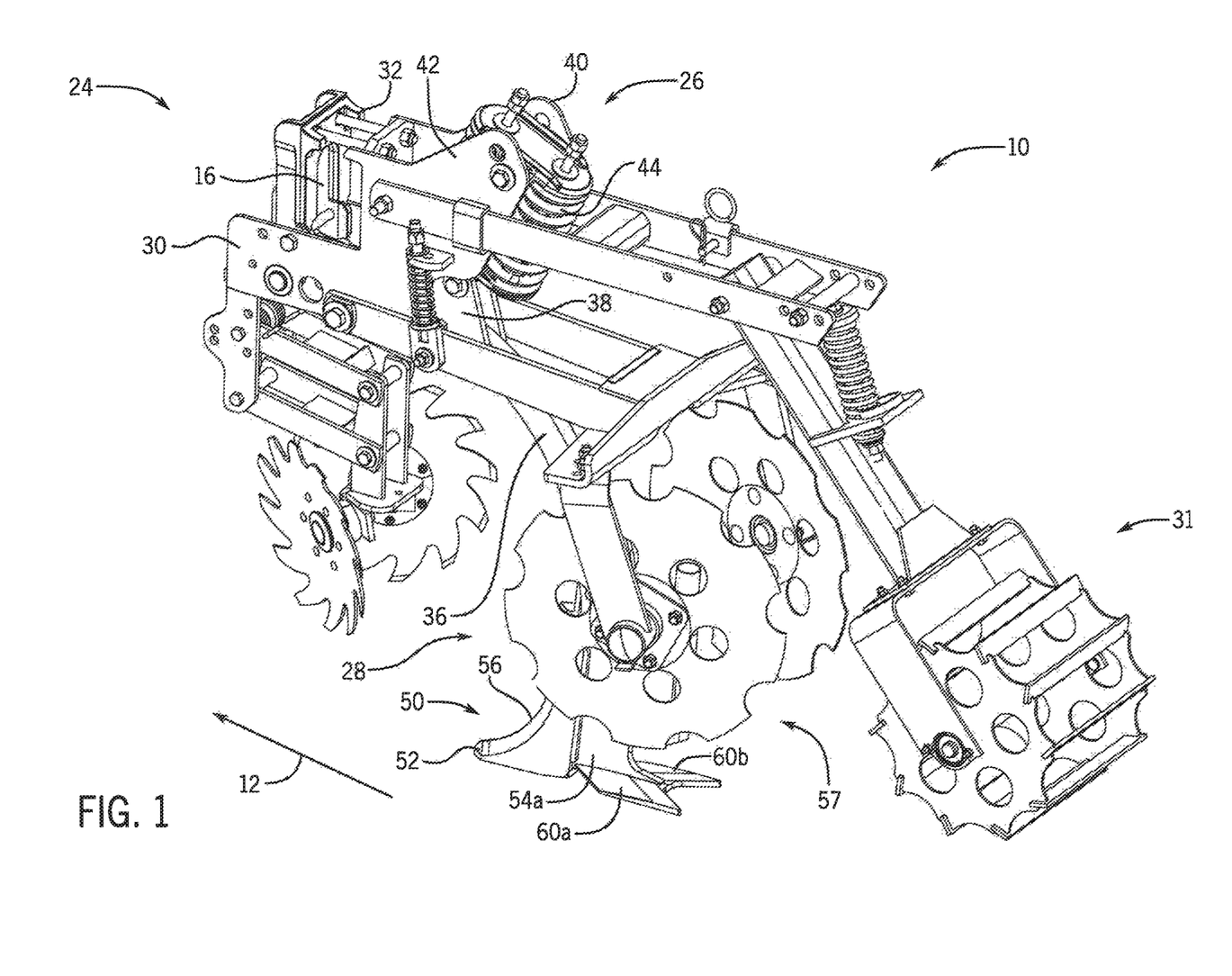
FIG. 1 is an isometric view of a working unit of a strip-till implement, the working unit having a strip-till knife, in accordance with an aspect of the invention.

Referring now to the drawings and specifically to FIG. 1, an isometric view of a working unit 10 of a strip-till implement is provided in accordance with an aspect of the invention. For purposes of discussion, the term "working unit" will be used herein to refer to a grouping of apparatus, for example as shown in FIG. 1, that engage the ground in concert to accomplish a certain tasks. In the case of the instant invention, the task accomplished is the creation of an improved strip-till seedbed in the form of a raised berm superiorly suited for planting.

The working unit 10 can be a conventional working unit for strip tillage. Accordingly, various ground-engaging apparatus are shown in a ground engaging position for strip-tilling in a direction of travel 12, with strip-till knife having a lower most portion several inches into the ground. The working unit 10 can be attached to an implement frame adapted to be drawn across the ground by a tractor. The implement frame conventionally includes a long, main tubular frame member, or toolbar, 16 that extends transversely to the direction of travel 12 in a desired width for the number of working units chosen. Toolbar 16 can comprise one or more sections that, in wider configurations, fold up into a more compact package for transport and storage. The location of the working units may be changed when it is desired to alter the spacing between adjacent working units, i.e., the working units may be relocated relative to one another along the toolbar. Typical implements can have 6, 8, 12, 16 or more working units mounted to the toolbar at lateral spacings of 30-36 inches or more as determined by planter row spacing.

The working unit 10 can comprise several basic components, including a toolbar mounting assembly 24, a shank assembly 26, a soil gather blade assembly 28, and conditioning rotary reel assembly 31.

The toolbar mounting assembly 24 can be comprised of a heavy-gauge steel irregularly shaped coupler 30 with a transverse adjustable opening, or track 32 there through that is fitted to the toolbar 16. The coupler 30 is sufficiently rigid and affixed to the toolbar such that the remainder of the basic components form a working unit 10 are supported by the toolbar.

Figure 2:
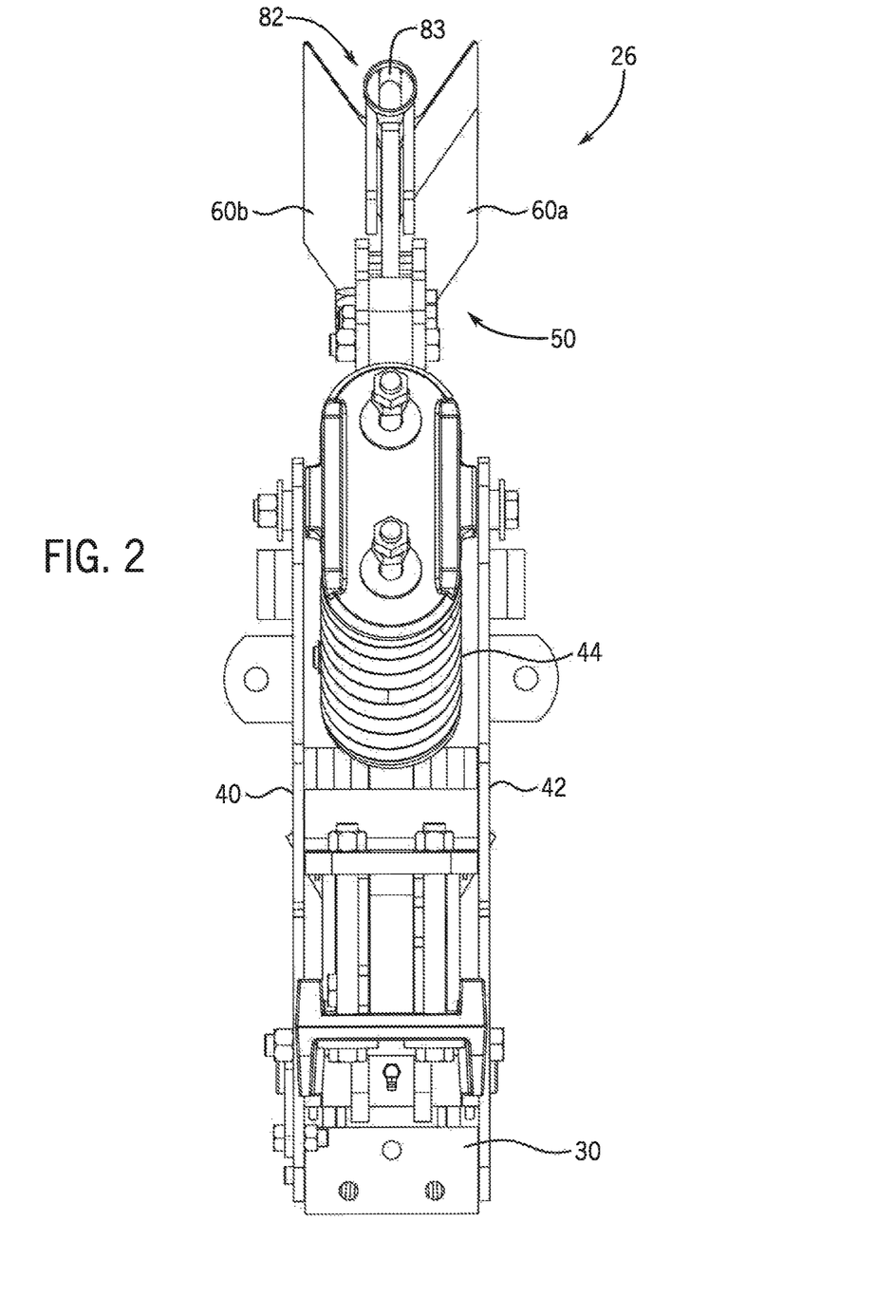
FIG. 2 is a plan view of a shank assembly of the working unit of FIG. 1, the shank assembly supporting the strip-till knife.

With additional reference to FIG. 2, the shank assembly 26 is comprised of shank 36, a shank bracket 38 including a pair of side plates 40, 42 affixed to coupler 30 of the toolbar mounting assembly 24, a compression spring 44 affixed at the top end to coupler 30 and to shank bracket 38 at the bottom end by a bolt. The shank bracket 38 is pivotably affixed to toolbar coupler 30 by a pin such that the shank 36 may pivot a distance limited by the amount that spring 44 can be compressed. The shank 36 is affixed to shank bracket 38 by bolts. Shank 36 is formed of heavy plate stock having a thickness of about 1¼ inches, although this dimension is not critical to the instant invention.

Figure 3:
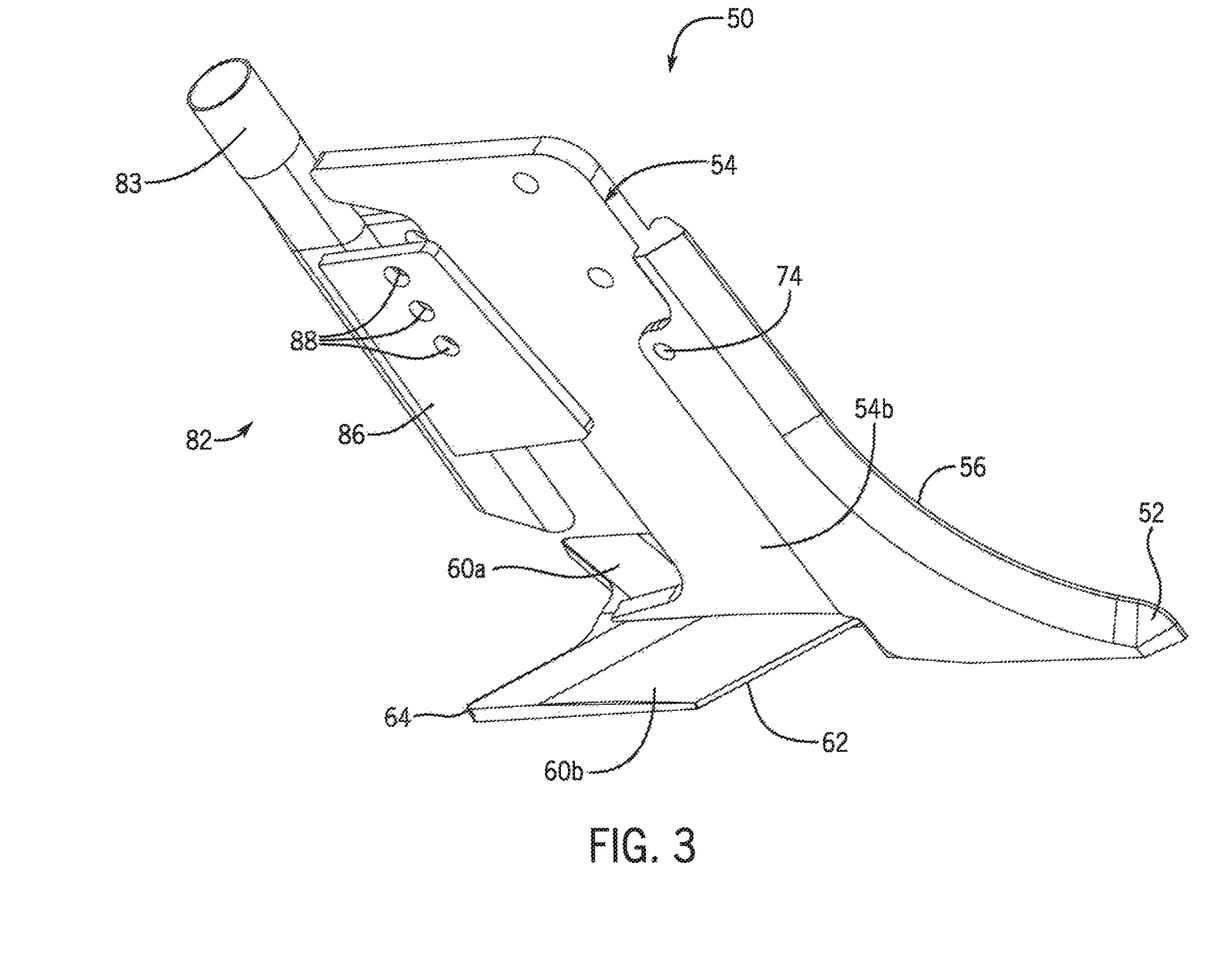
FIG. 3 is an isometric view of the strip-till knife of FIG. 1.
Figure 4:
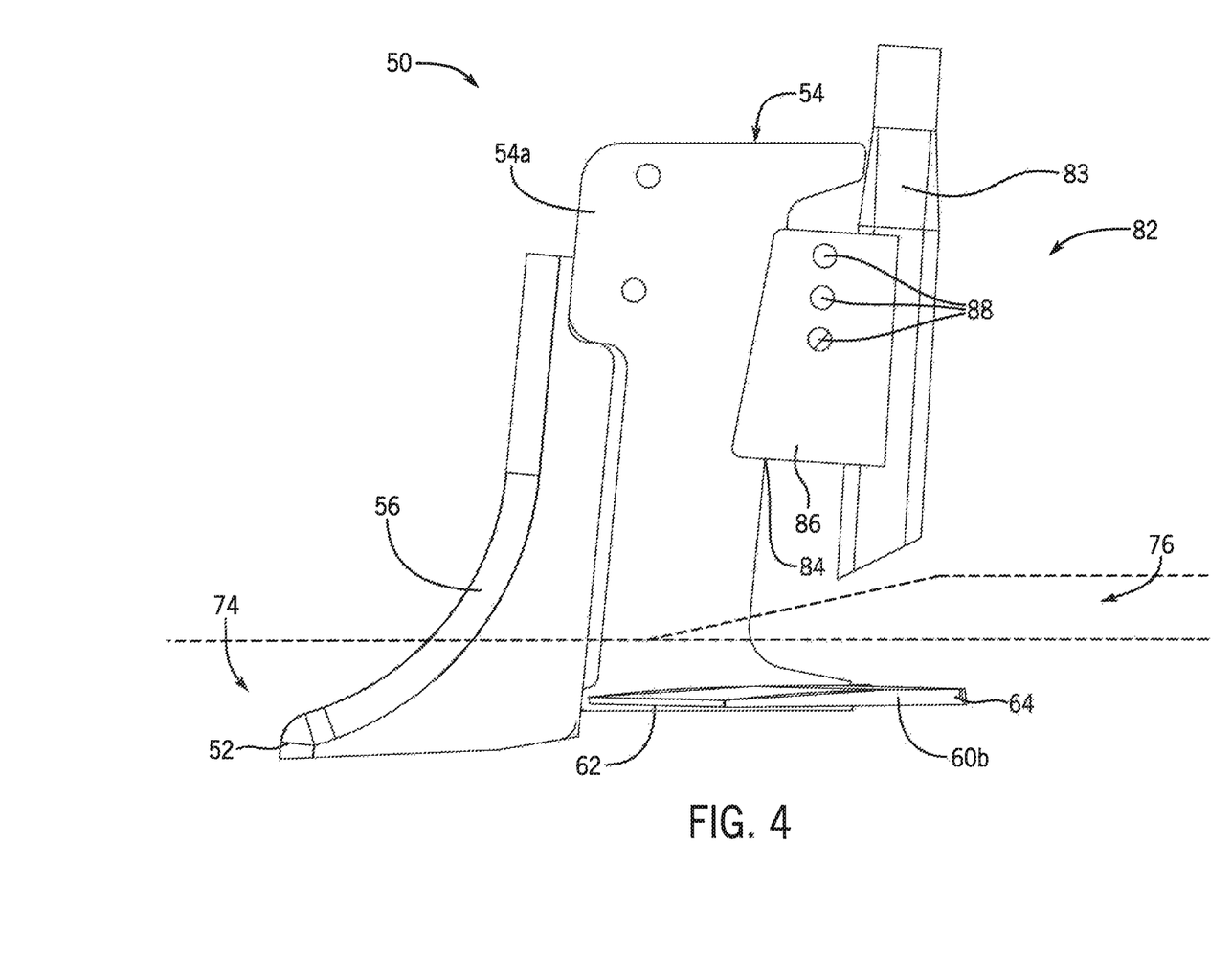
FIG. 4 is a side view of the strip-till knife of FIG. 1.
Figure 5:
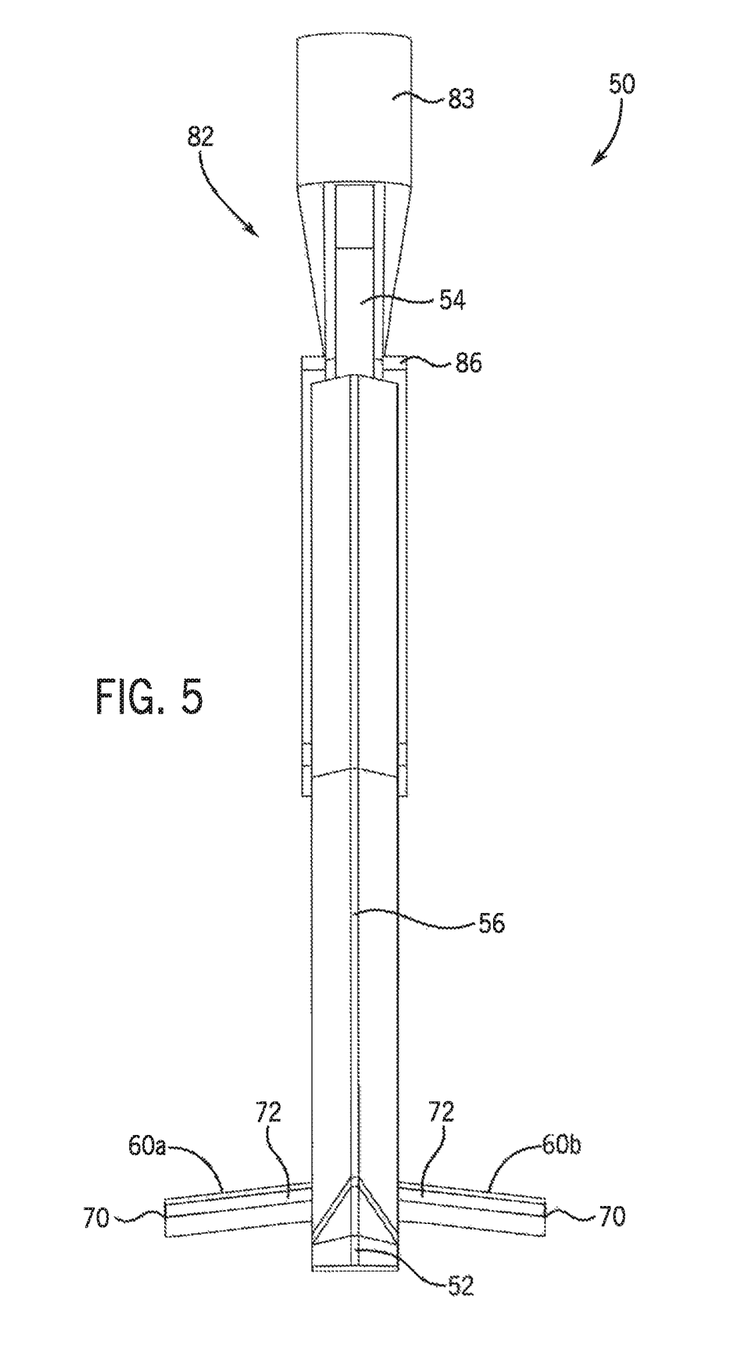
FIG. 5 is a front view of the strip-till knife of FIG. 1.

The shank 36 is characterized herein as being generally curved; however, other configurations could prove satisfactory. In any event, with additional reference to FIGS. 3-5, the shank 36 extends forwardly to a ground engaging strip-till knife 50 having a ground-breaking tillage point or nose 52. A body 54 of the strip-till knife 50 is configured to connect to the shank 36. A knife edge 56 extends from a front portion of the body 54 in the direction of travel 12. The knife edge 56 can be configured to engage soil along the direction of travel 12 to create a berm along the ground, in an aft area 57 of the body 54. The nose 52 can extend from a lower most portion of the knife edge 56 for ground-breaking.

In accordance with an aspect of the invention, first and second wings 60a and 60b can extend from first and second side portions 54a and 54b, of the body 54, respectively. The first and second wings 60a and 60b, respectively, can be configured to lift soil laterally with respect to the body 54, proximal to the first and second side portions 54a and 54b, to twist and roll the soil in wider swath to create the berm. In one aspect, a side profile of each wing 60 can resemble an airfoil, a structure with curved surfaces designed to give the most favorable ratio of lift to drag in flight, here being a structure with curved surfaces designed to give the most favorable ratio of soil lift to drag. In addition, as may be best seen in the top view of FIG. 2, each wing 60 can be swept rearward for optimum twist and roll to build the berm. Also, as may be best seen in the isometric and side views of FIGS. 3 and 4, each wing 60 can be angled downward in the direction of travel 12 so that a front portion 62 of the wing 60 is lower than a rear portion 64 of the wing 60 for optimum soil lift. In such cases, each wing 60 is preferably angled downward by an angle of less than 5°. Also, as may be best seen in the front view of FIG. 5, each wing 60 can be angled downward in an outward direction extending from a side portion of the body so that an outer portion 70 of each wing 60 is lower than an inner portion 72 of the wing 60. In such cases, each wing 60 is preferably angled downward by an angle of less than 5°, As a result, with reference to FIG. 3, in operation, the knife edge 56 can cut into the ground 74 to lift and twist the soil in a wider swath to build berm 76 aft of the body 54 of the strip-till knife 50.

Figure 6:
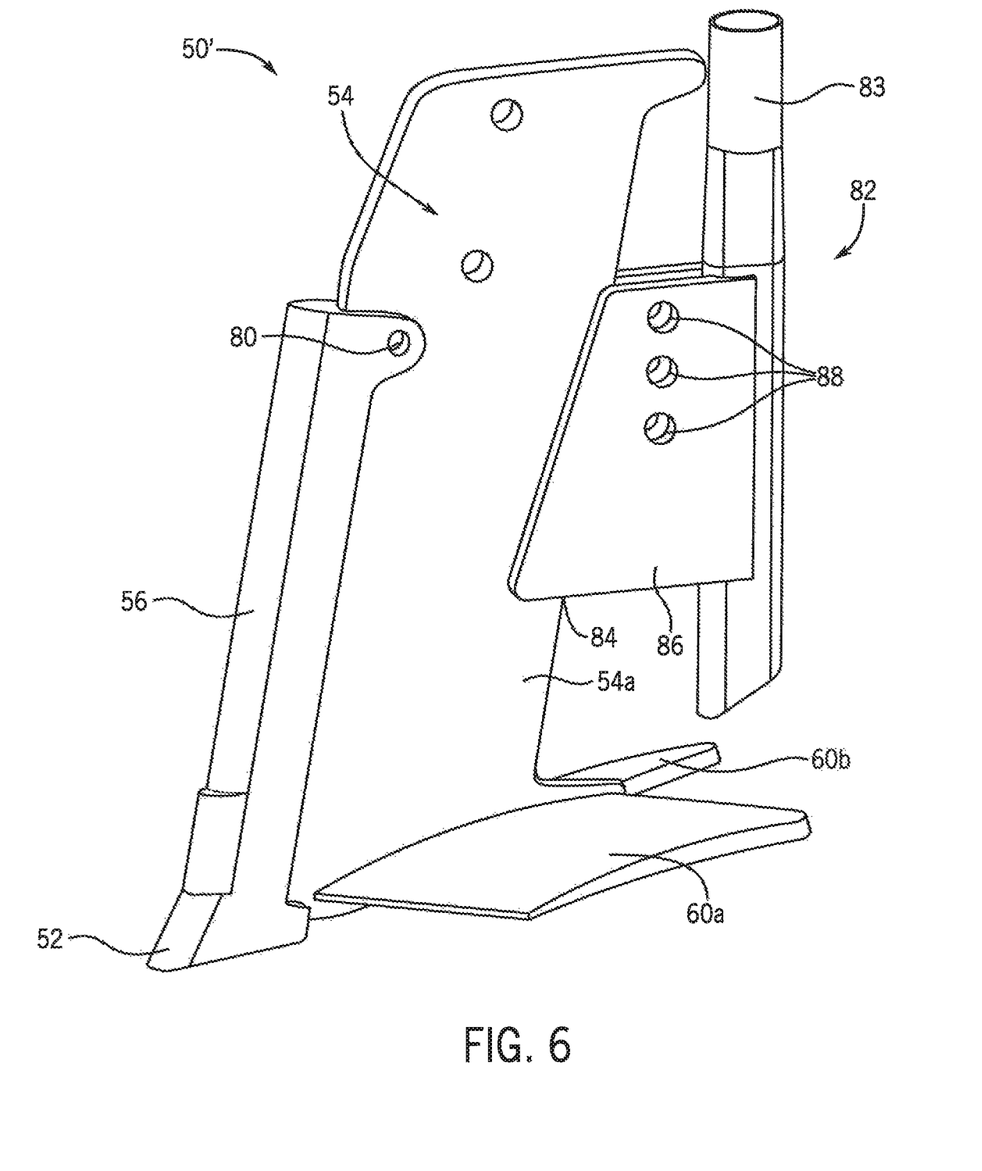
FIG. 6 is an isometric view of an alternative strip-till knife in accordance with an aspect of the invention.
Figure 7:
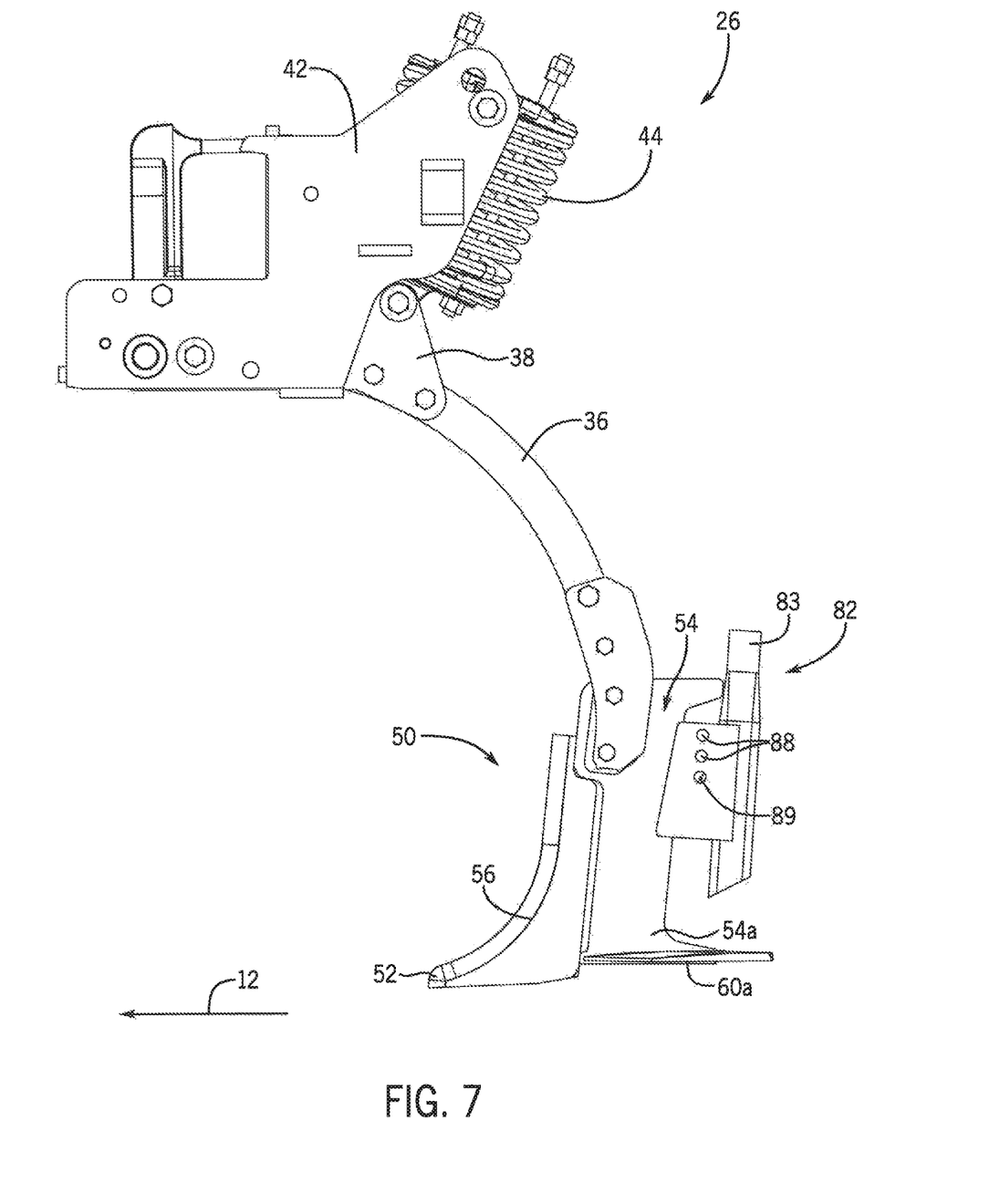
FIG. 7 is a side view of the shank assembly of FIG. 2 in which the strip-till knife is in position for strip-till operation, before encountering a resistance.

Referring now to FIG. 6, in one aspect, where like numerals refer to like parts throughout, in an alternative strip-till knife 50', the knife edge 56 can be removably connected to the body 54 by a fastener 80, such as a pin. This can accommodate periodic replacement of the knife edge 56 which may be useful from time to time due to dulling of the blade. Removal of the knife edge 56 can comprise removing the fastener 80 and sliding the knife edge 56 out of engagement with the body 54. The knife edge 56 may be engaged with the body 54, for example, by a protrusion of one, such as the knife edge 56, fitting into a channel or groove of the other, such as the body 54. However, in one aspect, the knife edge 56 can be permanently attached to the base 54. Also, the knife edge 56 could be parabolic in shape or straight/ linear in shape.

In addition, in one aspect, the strip-till knife 50 can include an agricultural product delivery tube 82 extending from a rear portion 84 of the body 54. The delivery tube 82 can be configured to deposit an agricultural product into the berm, such as plant seeds and/or dry, liquid or gas fertilizers, through a conveying channel 83. A delivery tube bracket 86 can be used to attach the delivery tube 82 to the body 54. The delivery tube bracket 86 and the body 54 can each include a multiple apertures 88 for receiving a fastener 89 (see FIGS. 8 and 9), such as a bolt. Accordingly, the delivery tube 86 can be adjustable in height with respect to the berm by adjustment of a fastener 89 from one pair of apertures 88 between the delivery tube bracket 86 and the body 54 to another pair of apertures 88 (which are higher or lower) between the delivery tube bracket 86 and the body 54.

Figure 8:
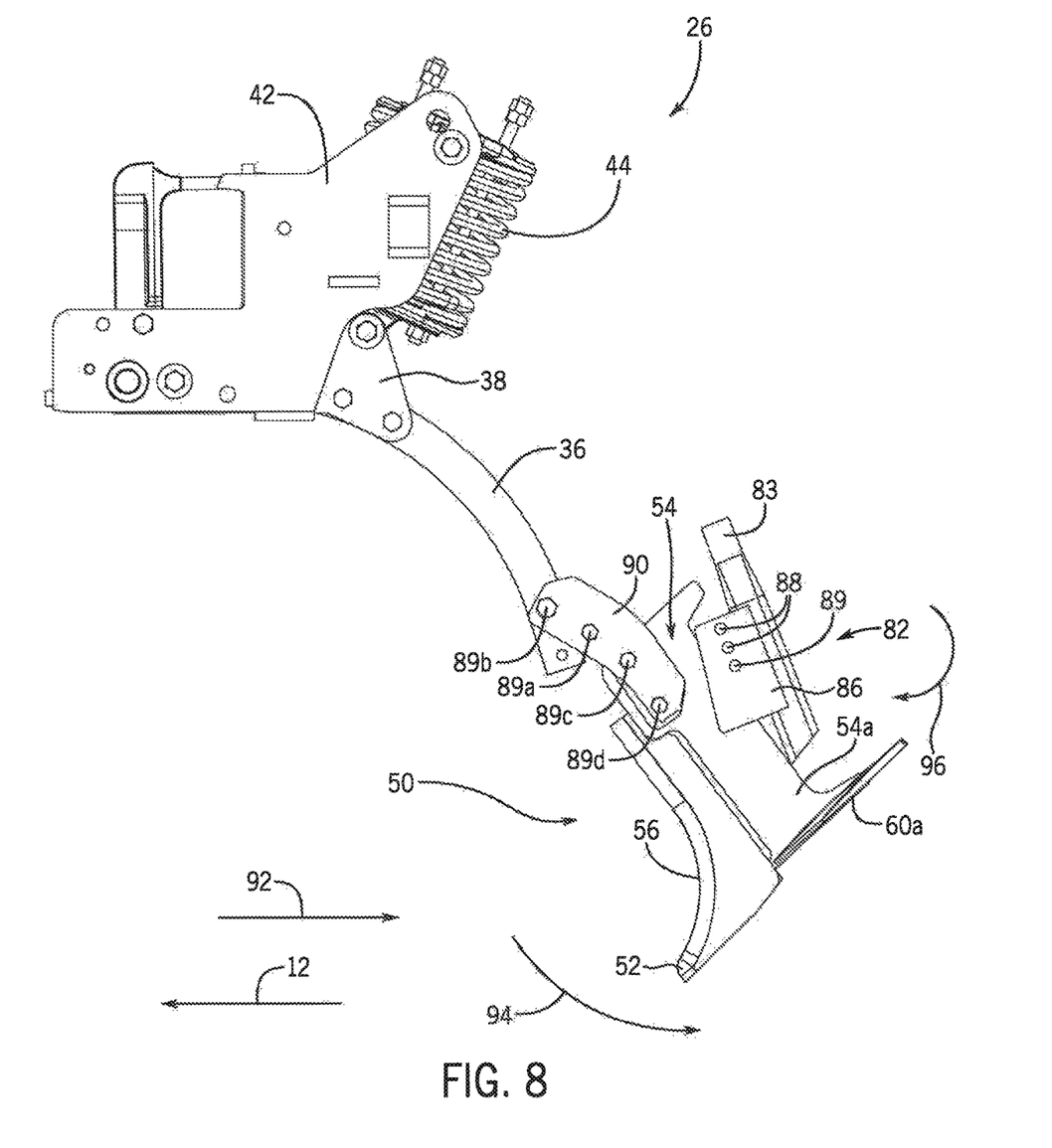
FIG. 8 is a side view of the shank assembly of FIG. 2 in which the strip-till knife is no longer in position for strip-till operation, after encountering a resistance, in accordance with an aspect of the invention.

In addition, referring particularly to FIG. 8, the body 54 of the strip-till knife 50 is configured to connect to the shank 36 by a multiple fasteners 89a-d, such as bolts, and a joining plate 90. The fasteners 89 can include, for example, first and second fasteners 89a and 89b, respectively, between the joining plate 90 and the shank 36, and third and fourth fasteners 89c and 89d, respectively, between the joining plate 90 and the body 54. Referring specifically to FIG. 8, in one aspect, the first fastener 89a can be configured to shear upon the body 54 encountering a resistance 92 greater than a threshold, such as a rock or tree roots, so that the body 54 can pivot about the second fastener 89b. To accomplish this, the first fastener 89a could be smaller than the second fastener 89b. Alternatively, the third fastener 89c can be configured to shear upon the body 54 encountering the resistance 92 greater than the threshold, so that the body 54 can pivot about the fourth fastener 89d. In this case, the third fastener 89c could be smaller than the fourth fastener 89d. In any case, the result is that upon the body 54 encountering the resistance 92, the body 54 can pivot in a first direction 94 about the fastener which remains intact (such as the second fastener 89b), swinging reward to avoid damaging the strip-till knife 50. In addition, when this occurs, the delivery tube 82 can be configured to pivot in a second direction 96 which is opposite to the first direction 94, swinging forward to avoid crimping of the delivery tube 82.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A strip-till knife, comprising:
a body configured to connect to a shank;
a knife edge extending from a front portion of the body in a direction of travel, the knife edge being configured to engage soil along the direction of travel to create a berm aft of the body, the knife edge having a nose extending from a lower most portion;
first and second wings extending from first and second side portions of the body, respectively, the first and second wings being configured to lift soil laterally with respect to the body; and
an agricultural product delivery tube extending from a rear portion of the body, the agricultural product delivery tube being configured to deposit an agricultural product into the berm;
wherein the first and second wings each include a cambered airfoil shape configured to affect soil lift to drag ratio.

2. The strip-till knife of claim 1, wherein each wing is angled downward in the direction of travel so that a front portion of the wing is lower than a rear portion of the wing.

3. The strip-till knife of claim 2, wherein each wing is angled downward by less than 5°.

4. The strip-till knife of claim 1, wherein each wing is angled downward in an outward direction extending from a side portion of the body so that an outer portion of the wing is lower than an inner portion of the wing.

5. The strip-till knife of claim 1, wherein each wing is swept rearward.

6. The strip-till knife of claim 1, wherein the knife edge is removably connected to the body by a fastener.

7. The strip-till knife of claim 6, wherein the knife edge and the body are in connection with another by protrusion of one of the knife edge or the body being received in a channel of the other of the knife edge or the body.

8. The strip-till knife of claim 1, wherein the body is configured to connect to the shank by a plurality of fasteners.

9. The strip-till knife of claim 8, wherein the plurality of fasteners includes first and second fasteners on one of the body or the shank, wherein the first fastener is configured to shear upon the body encountering a resistance greater than a threshold so that the body can pivot about the second fastener.

10. The strip-till knife of claim 9, wherein the first and second fasteners comprise first and second bolts, respectively, wherein the first bolt is smaller than the second bolt.

11. The strip-till knife of claim 1, wherein the agricultural product delivery tube is configured to connect to the body by a fastener, wherein the agricultural product delivery tube is configured to pivot about the fastener so that rotation of the body in a first direction upon encountering a resistance greater than a threshold causes a rotation of the agricultural product delivery tube in a second direction opposing the first direction.

12. The strip-till knife of claim 1, wherein the agricultural product delivery tube is adjustable in height with respect to the body.

13. The strip-till knife of claim 12, further comprising a bracket for attaching the agricultural product delivery tube to the body, wherein the bracket and the body each include a plurality of apertures for receiving a fastener, wherein the agricultural product delivery tube is adjustable in height by adjustment of the fastener from one pair of apertures between the bracket and the body to another pair of apertures between the bracket and the body.

14. A method for providing a strip-till knife, comprising:
providing a body for connecting to a shank;
providing a knife edge extending from a front portion of the body in a direction of travel, the knife edge for engaging soil along the direction of travel to create a berm aft of the body, the knife edge having a nose extending from a lower most portion;
providing first and second cambered airfoil-shaped wings extending from first and second side portions of the body, respectively, the first and second cambered airfoil- shaped wings for lifting soil laterally with respect to the body; and
providing an agricultural product delivery tube extending from a rear portion of the body, the agricultural product delivery tube for depositing an agricultural product into the berm.

15. The method of claim 14, further comprising angling each cambered airfoil-shaped wing downward in the direction of travel so that a front portion of the wing is lower than a rear portion of the wing.

16. The method of claim 14, further comprising angling each wing downward in an outward direction extending from a side portion of the body so that an outer portion of the wing is lower than an inner portion of the wing.

17. The method of claim 14, further comprising removably connecting the knife edge to the body by a fastener.

18. The method of claim 14, further comprising connecting the body to the shank by a plurality of fasteners, wherein the plurality of fasteners includes first and second fasteners on one of the body or the shank, and configuring the first fastener to shear upon the body encountering a resistance greater than a threshold so that the body can pivot about the second fastener.

19. The method of claim 14, further comprising connecting the agricultural product delivery tube to connect to the body by a fastener, and configuring the agricultural product delivery tube to pivot about the fastener so that rotation of the body in a first direction upon encountering a resistance greater than a threshold causes a rotation of the agricultural product delivery tube in a second direction opposing the first direction.

20. The method of claim 14, further comprising adjusting the agricultural product delivery tube in height with respect to the body.

* * * * *